US009058820B1

(12) United States Patent
Mascaro et al.

(10) Patent No.: US 9,058,820 B1
(45) Date of Patent: Jun. 16, 2015

(54) IDENTIFYING SPEECH PORTIONS OF A SOUND MODEL USING VARIOUS STATISTICS THEREOF

(71) Applicant: The Intellisis Corporation, San Diego, CA (US)

(72) Inventors: Massimo Mascaro, San Diego, CA (US); David C. Bradley, La Jolla, CA (US)

(73) Assignee: The Intellisis Corporation, San Diego, CA (US)

( * ) Notice: Subject to any disclaimer, the term of this patent is extended or adjusted under 35 U.S.C. 154(b) by 235 days.

(21) Appl. No.: 13/899,264

(22) Filed: May 21, 2013

(51) Int. Cl.
  *G10L 19/00* (2013.01)
  *G10L 21/0272* (2013.01)
  *G10L 15/187* (2013.01)
  *G10L 15/26* (2006.01)

(52) U.S. Cl.
  CPC ........... *G10L 21/0272* (2013.01); *G10L 15/187* (2013.01); *G10L 15/26* (2013.01); *G10L 15/265* (2013.01)

(58) Field of Classification Search
  None
  See application file for complete search history.

(56) References Cited

U.S. PATENT DOCUMENTS

| | | | |
|---|---|---|---|
| 5,815,580 A | 9/1998 | Craven et al. | 381/58 |
| 7,117,149 B1 | 10/2006 | Zakarauskas | 704/233 |
| 7,249,015 B2 | 7/2007 | Jiang et al. | 704/222 |
| 7,389,230 B1 | 6/2008 | Nelken | 704/255 |
| 7,664,640 B2 | 2/2010 | Webber | 704/243 |
| 7,668,711 B2 | 2/2010 | Chong et al. | 704/219 |
| 8,005,666 B2 * | 8/2011 | Goto et al. | 704/207 |
| 8,249,284 B2 * | 8/2012 | Allegro-Baumann et al. | 381/309 |
| 8,473,282 B2 * | 6/2013 | Yoshioka | 704/206 |
| 8,880,409 B2 * | 11/2014 | Fujihara et al. | 704/278 |
| 2004/0128130 A1 | 7/2004 | Rose et al. | 704/236 |
| 2004/0138882 A1 * | 7/2004 | Miyazawa | 704/233 |
| 2004/0176949 A1 | 9/2004 | Wenndt et al. | 704/203 |
| 2004/0220475 A1 | 11/2004 | Szabo et al. | 600/458 |
| 2005/0114128 A1 | 5/2005 | Hetherington et al. | 704/233 |

(Continued)

FOREIGN PATENT DOCUMENTS

| | | |
|---|---|---|
| WO | WO 2012/129255 | 9/2012 |
| WO | WO 2012/134991 | 10/2012 |
| WO | WO 2012/134993 | 10/2012 |

OTHER PUBLICATIONS

Kumar et al., "Speaker Recognition Using GMM", *International Journal of Engineering Science and Technology*, vol. 2, No. 6, 2010, retrieved from the Internet: http://www.ijest.info/docs/IJEST10-02-06-112.pdf, pp. 2428-2436.

(Continued)

*Primary Examiner* — Satwant Singh
(74) *Attorney, Agent, or Firm* — Arnold & Porter LLP (57) ABSTRACT

Speech portions of a sound model may be identified using various statistics associated with the sound model for voice enhancement of noisy audio signals. A spectral motion transform may be performed on an input signal to obtain a linear fit in time of a sound model of the input signal. Statistics may be extracted from the linear fit of the sound model of the input signal. Speech portions of the linear fit of the sound model of the input signal may be identified by detecting a presence of harmonics as a function of time in the linear fit of the sound model of the input signal based on individual ones of the extracted statistics. An output signal may be provided that conveys audio comprising a reconstructed speech component of the input signal with a noise component of the input signal being suppressed.

20 Claims, 4 Drawing Sheets

(56) References Cited

U.S. PATENT DOCUMENTS

| | | | |
|---|---|---|---|
| 2006/0100866 A1 | 5/2006 | Alewine et al. | 704/226 |
| 2007/0010997 A1 | 1/2007 | Kim | 704/208 |
| 2008/0082323 A1 | 4/2008 | Bai et al. | 704/214 |
| 2009/0012638 A1 | 1/2009 | Lou | 700/94 |
| 2009/0076822 A1 | 3/2009 | Sanjaume | 704/268 |
| 2010/0260353 A1 | 10/2010 | Ozawa | 381/94.3 |
| 2010/0332222 A1 | 12/2010 | Bai et al. | 704/214 |
| 2011/0016077 A1 | 1/2011 | Vasilache et al. | 706/52 |
| 2011/0060564 A1 | 3/2011 | Hoge | 703/2 |
| 2011/0286618 A1 | 11/2011 | Vandali et al. | 381/320 |
| 2012/0243694 A1 | 9/2012 | Bradley et al. | 381/56 |
| 2012/0243705 A1 | 9/2012 | Bradley et al. | 381/94.4 |
| 2012/0243707 A1 | 9/2012 | Bradley et al. | 381/98 |

OTHER PUBLICATIONS

Kamath et al, "Independent Component Analysis for Audio Classification", *IEEE 11th Digital Signal Processing Workshop & IEEE Signal Processing Education Workshop*, 2004, retrieved from the Internet: http://2002.114.89.42/resource/pdf/1412.pdf, pp. 352-355.

Vargas-Rubio et al., "An Improved Spectrogram Using the Multiangle Centered Discrete Fractional Fourier Transform", *Proceedings of International Conference on Acoustics, Speech, and Signal Processing*, Philadelphia, 2005, retrieved from the internet: <URL: http://www.ece.unm.edu/faculty/beanthan/PUB/ICASSP-05-JUAN.pdf>, 4 pages.

\* cited by examiner

IDENTIFYING SPEECH PORTIONS OF A SOUND MODEL USING VARIOUS STATISTICS THEREOF

FIELD OF THE DISCLOSURE

This disclosure relates to identifying speech portions of a sound model using various statistics associated with the sound model for voice enhancement of noisy audio signals.

BACKGROUND

Systems configured to identify speech in an audio signal are known. Existing systems, however, typically may rely on an ability to identify phonemes in the signal. A phoneme-based approach may be unreliable at least because phonemes may vary according to context.

SUMMARY

One aspect of the disclosure relates to a system configured to perform voice enhancement on noisy audio signals, in accordance with one or more implementations. Speech portions of a sound model may be identified using various statistics associated with the sound model for voice enhancement of noisy audio signals. A spectral motion transform may be performed on an input signal to obtain a linear fit in time of a sound model of the input signal. Statistics may be extracted from the linear fit of the sound model of the input signal. Speech portions of the linear fit of the sound model of the input signal may be identified by detecting a presence of harmonics as a function of time in the linear fit of the sound model of the input signal based on individual ones of the statistics extracted by the statistics extraction module. An output signal may be provided that conveys audio comprising a reconstructed speech component of the input signal with a noise component of the input signal being suppressed.

The communications platform may be configured to execute computer program modules. The computer program modules may include one or more of an input module, one or more extraction modules, a reconstruction module, an output module, and/or other modules.

The input module may be configured to receive an input signal from a source. The input signal may include human speech (or some other wanted signal) and noise. The waveforms associated with the speech and noise may be superimposed in input signal.

Generally speaking, the extraction module(s) may be configured to extract harmonic information from the input signal. The extraction module(s) may include one or more of a transform module, a statistics extraction module, a time-striping module, a vocalized speech module, a non-vocalized speech module, a formant model module, and/or other modules.

The transform module may be configured to obtain a linear fit in time of a sound model over a small time window (e.g., 30-60 milliseconds) of the input signal. A sound model may be described as a mathematical representation of harmonics in an audio signal. The transform module may be configured to model the input signal as a superposition of harmonics that all share a common pitch and chirp.

The statistics extraction module may be configured to extract statistics from the sound model and/or the linear fit of the sound model of the input signal provided by the transform module. The statistics may include one or more of a fit statistic, an energy statistic, an evidence statistic, a frequency center-of-mass statistic, a pitch probability statistic, an envelope probability statistic, a chirp confidence statistic, and/or other statistics associated with the sound model and/or the linear fit of the sound model of the input signal provided by the transform module. The fit statistic may describe a goodness-of-fit of the linear fit of the sound model. The energy statistic may describe energy associated with individual harmonics. The evidence statistic may indicate whether a given harmonic exceeds a background signal. The frequency center-of-mass statistic may approximately describe a middle position of a frequency distribution of harmonics. The pitch probability statistic may describe a probability distribution of pitch associated with a human speaker associated with the speech component of the input signal. The envelope probability statistic may describe a typical range of envelope shapes associated with a human speaker. The chirp confidence statistic may describe a confidence of a chirp estimate.

The time-striping module may be configured to identify vocalized speech portions of the input signal, the sound model of the input signal, and/or the linear fit of the sound model of the input signal. The vocalized speech portions may be identified by detecting a presence of harmonics as a function of time based on individual ones of the statistics extracted by the statistics extraction module. The time-striping module may be configured to classify the portions of the speech component represented by the input signal in the individual time windows as vocalized portions or non-vocalized portions based on the statistics determined for the individual time windows. In some implementations, the time-striping module may be configured to combine multiple ones of the statistics provided by the statistics extraction module into an authoritative statistic such that a presence of a harmonic is detected responsive to the authoritative statistic breaching a threshold. The vocalized speech portions may be visualizable as approximately vertical stripes in a spectrograph of the sound model, where the horizontal axis of the spectrograph corresponds to time and the vertical axis of the spectrograph corresponds to frequency.

The vocalized speech module may be configured to process sound models of time windows in which the speech component represented by the input signal is classified as vocalized portions. That is, a given sound model may be processed by the vocalized speech module responsive to the speech component represented by the input signal during the corresponding time window being classified as a vocalized portion. Processing the given sound model by vocalized speech module 108D may include processing the given sound model in conjunction with one or more other modules described herein other than the non-vocalized speech module.

The non-vocalized speech module may be configured to process sound models of time windows in which the speech component represented by the input signal is classified as non-vocalized portions. That is, a given sound model may be processed by the non-vocalized speech module responsive to the speech component represented by the input signal during the corresponding time window being classified as a non-vocalized portion. Processing the given sound model by the non-vocalized speech module may include processing the given sound model in conjunction with one or more other modules described herein other than the vocalized speech module.

The formant model module may be configured to model harmonic amplitudes based on a formant model. Generally speaking, a formant may be described as the spectral resonance peaks of the sound spectrum of the voice. One formant model—the source-filter model—postulates that vocalization in humans occurs via an initial periodic signal produced by the glottis (i.e., the source), which is then modulated by resonances in the vocal and nasal cavities (i.e., the filter).

The reconstruction module may be configured to reconstruct the speech component of the input signal with the noise component of the input signal being suppressed. The reconstruction may be performed once each of the parameters of the formant model has been determined. The reconstruction may be performed by interpolating all the time-dependent parameters and then resynthesizing the waveform of the speech component of the input signal.

The output module may be configured to transmit an output signal to a destination. The output signal may include the reconstructed speech component of the input signal.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Speech portions of a sound model may be identified using various statistics associated with the sound model for voice enhancement of noisy audio signals. A spectral motion transform may be performed on an input signal to obtain a linear fit in time of a sound model of the input signal. Statistics may be extracted from the linear fit of the sound model of the input signal. Speech portions of the linear fit of the sound model of the input signal may be identified by detecting a presence of harmonics as a function of time in the linear fit of the sound model of the input signal based on individual ones of the statistics extracted by the statistics extraction module. An output signal may be provided that conveys audio comprising a reconstructed speech component of the input signal with a noise component of the input signal being suppressed.

Figure 1:
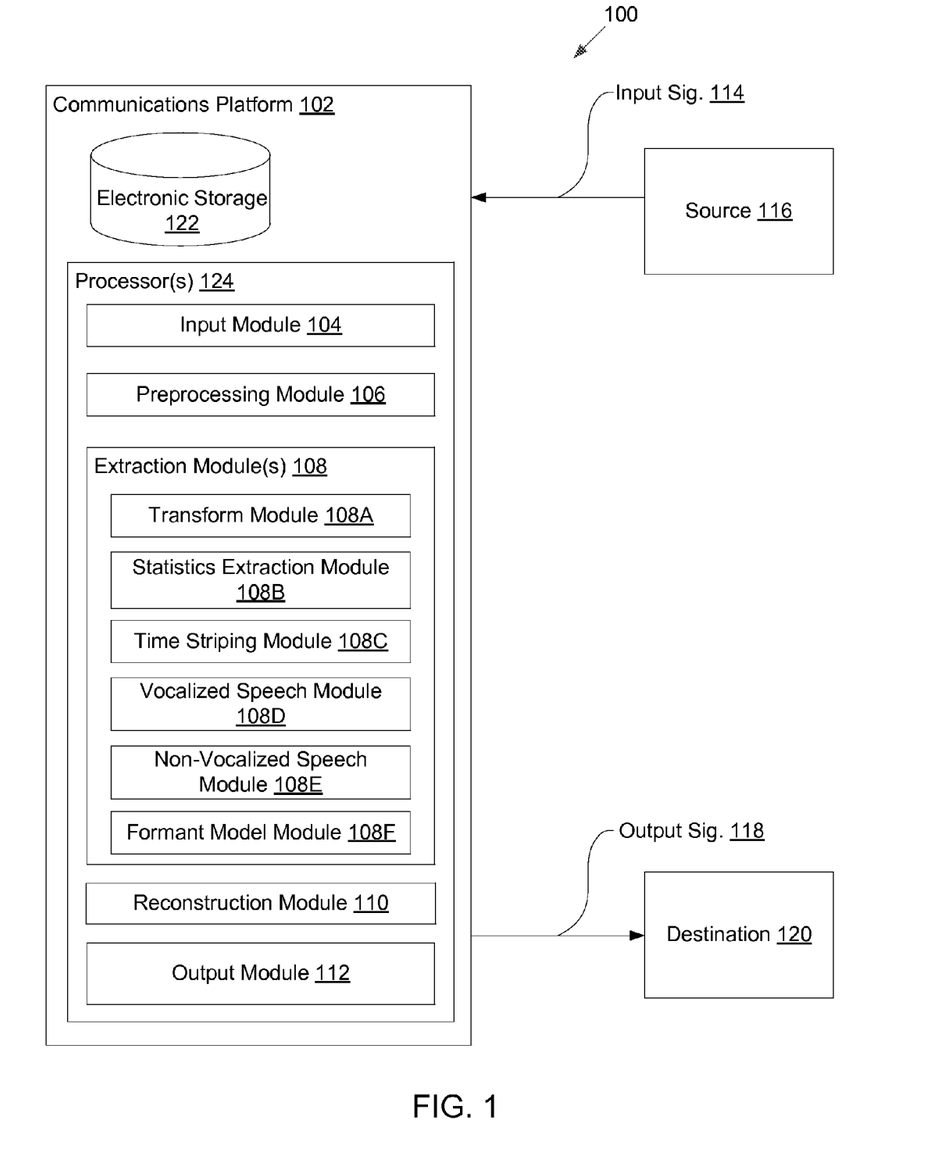
FIG. 1 illustrates a system configured to perform voice enhancement on noisy audio signals, in accordance with one or more implementations.

FIG. 1 illustrates a system 100 configured to perform voice enhancement on noisy audio signals, in accordance with one or more implementations. Voice enhancement may be also referred to as de-noising or voice cleaning. As depicted in FIG. 1, system 100 may include a communications platform 102 and/or other components. Generally speaking, a noisy audio signal containing speech may be received by communications platform 102. The communications platform 102 may extract harmonic information from the noisy audio signal. The harmonic information may be used to reconstruct speech contained in the noisy audio signal. By way of non-limiting example, communications platform 102 may include a mobile communications device such as a smart phone, according to some implementations. Other types of communications platforms are contemplated by the disclosure, as described further herein.

The communications platform 102 may be configured to execute computer program modules. The computer program modules may include one or more of an input module 104, a preprocessing module 106, one or more extraction modules 108, a reconstruction module 110, an output module 112, and/or other modules.

The input module 104 may be configured to receive an input signal 114 from a source 116. The input signal 114 may include human speech (or some other wanted signal) and noise. The waveforms associated with the speech and noise may be superimposed in input signal 114. The input signal 114 may include a single channel (i.e., mono), two channels (i.e., stereo), and/or multiple channels. The input signal 114 may be digitized.

Speech is the vocal form of human communication. Speech is based upon the syntactic combination of lexicals and names that are drawn from very large vocabularies (usually in the range of about 10,000 different words). Each spoken word is created out of the phonetic combination of a limited set of vowel and consonant speech sound units. Normal speech is produced with pulmonary pressure provided by the lungs which creates phonation in the glottis in the larynx that is then modified by the vocal tract into different vowels and consonants. Various differences among vocabularies, syntax that structures individual vocabularies, sets of speech sound units associated with individual vocabularies, and/or other differences create the existence of many thousands of different types of mutually unintelligible human languages.

The noise included in input signal 114 may include any sound information other than a primary speaker's voice. The noise included in input signal 114 may include structured noise and/or unstructured noise. A classic example of structured noise may be a background scene where there are multiple voices, such as a café or a car environment. Unstructured noise may be described as noise with a broad spectral density distribution. Examples of unstructured noise may include white noise, pink noise, and/or other unstructured noise. White noise is a random signal with a flat power spectral density. Pink noise is a signal with a power spectral density that is inversely proportional to the frequency.

Figure 2:
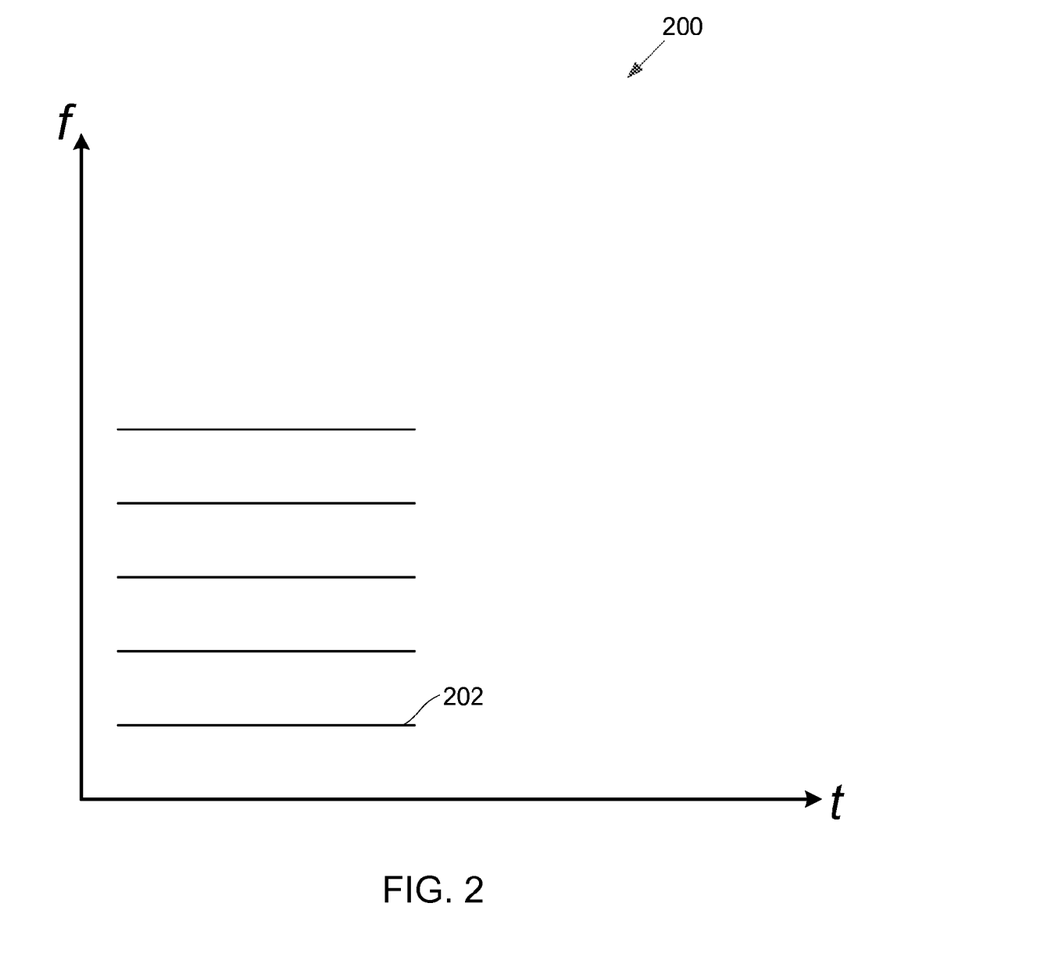
FIG. 2 illustrates an exemplary spectrogram, in accordance with one or more implementations.

An audio signal, such as input signal 114, may be visualized by way of a spectrogram. A spectrogram is a time-varying spectral representation that shows how the spectral density of a signal varies with time. Spectrograms may be referred to as spectral waterfalls, sonograms, voiceprints, and/or voicegrams. Spectrograms may be used to identify phonetic sounds. FIG. 2 illustrates an exemplary spectrogram 200, in accordance with one or more implementations. In spectrogram 200, the horizontal axis represents time (t) and the vertical axis represents frequency (f). A third dimension indicating the amplitude of a particular frequency at a particular time emerges out of the page. A trace of an amplitude peak as a function of time may delineate a harmonic in a signal visualized by a spectrogram (e.g., harmonic 202 in spectrogram 200). In some implementations, amplitude may be represented by the intensity or color of individual points in a spectrogram. In some implementations, a spectrogram may be represented by a 3-dimensional surface plot. The frequency and/or amplitude axes may be either linear or logarithmic, according to various implementations. An audio signal may be represented with a logarithmic amplitude axis (e.g., in decibels, or dB), and a linear frequency axis to emphasize harmonic relationships or a logarithmic frequency axis to emphasize musical, tonal relationships.

Referring again to FIG. 1, source 116 may include a microphone (i.e., an acoustic-to-electric transducer), a remote device, and/or other source of input signal 114. By way of non-limiting illustration, where communications platform 102 is a mobile communications device, a microphone integrated in the mobile communications device may provide input signal 114 by converting sound from a human speaker and/or sound from an environment of communications platform 102 into an electrical signal. As another illustration, input signal 114 may be provided to communications platform 102 from a remote device. The remote device may have its own microphone that converts sound from a human speaker and/or sound from an environment of the remote device. The remote device may be the same as or similar to communications platforms described herein.

The preprocessing module 106 may be configured to segment input signal 114 into discrete successive time windows. According to some implementations, a given time window may have a duration in the range of 30-60 milliseconds. In some implementations, a given time window may have a duration that is shorter than 30 milliseconds or longer than 60 milliseconds. The individual time windows of segmented input signal 114 may have equal durations. In some implementations, the duration of individual time windows of segmented input signal 114 may be different. For example, the duration of a given time window of segmented input signal 114 may be based on the amount and/or complexity of audio information contained in the given time window such that the duration increases responsive to a lack of audio information or a presence of stable audio information (e.g., a constant tone).

Generally speaking, extraction module(s) 108 may be configured to extract harmonic information from input signal 114. The extraction module(s) 108 may include one or more of a transform module 108A, a statistics extraction module 108B, a time-striping module 108C, a vocalized speech module 108D, a non-vocalized speech module 108E, a formant model module 108F, and/or other modules.

The transform module 108A may be configured to obtain a sound model over individual time windows of input signal 114. In some implementations, transform module 108A may be configured to obtain a linear fit in time of a sound model over individual time windows of input signal 114. A sound model may be described as a mathematical representation of harmonics in an audio signal. A harmonic may be described as a component frequency of the audio signal that is an integer multiple of the fundamental frequency (i.e., the lowest frequency of a periodic waveform or pseudo-periodic waveform). That is, if the fundamental frequency is f, then harmonics have frequencies 2f, 3f, 4f, etc.

The transform module 108A may be configured to model input signal 114 as a superposition of harmonics that all share a common pitch and chirp. Such a model may be expressed as:

$$m(t) = 2\Re\left(\sum_{h=1}^{N_h} A_h e^{j2\pi h(\phi t + \frac{\chi\phi}{2} t^2)}\right), \quad \text{EQN. 1}$$

where $\phi$ is the base pitch and $\chi$ is the fractional chirp rate $\left(\chi = \frac{c}{\phi}, \text{ where } c \text{ is the actual chirp}\right)$, where c is the actual chirp), both assumed to be constant. Pitch is defined as the rate of change of phase over time. Chirp is defined as the rate of change of pitch (i.e., the second time derivative of phase). The model of input signal 114 may be assumed as a superposition of $N_h$ harmonics with a linearly varying fundamental frequency. $A_h$ is a complex coefficient weighting all the different harmonics. Being complex, $A_h$ carries information about both the amplitude and about the initial phase for each harmonic.

The model of input signal 114 as a function of $A_h$ may be linear, according to some implementations. In such implementations, linear regression may be used to fit the model, such as follows:

$$\sum_{h=1}^{N_h} A_h e^{j2\pi h(\phi t + \frac{\chi\phi}{2} t^2)} = M(\phi, \chi, t)\overline{A} \quad \text{EQN. 2}$$

with, discretizing time as $(t_1, t_2, \ldots, t_{N_t})$:

$$M(\phi, \chi) =$$

$$\begin{bmatrix} e^{j2\pi(\phi t_1 + \frac{\chi\phi}{2} t_1^2)} & e^{j2\pi 2(\phi t_1 + \frac{\chi\phi}{2} t_1^2)} & \cdots & e^{j2\pi N_h(\phi t_1 + \frac{\chi\phi}{2} t_1^2)} \\ e^{j2\pi(\phi t_2 + \frac{\chi\phi}{2} t_2^2)} & e^{j2\pi 2(\phi t_2 + \frac{\chi\phi}{2} t_2^2)} & \cdots & e^{j2\pi N_h(\phi t_2 + \frac{\chi\phi}{2} t_2^2)} \\ \vdots & \vdots & \ddots & \vdots \\ e^{j2\pi(\phi t_{N_t} + \frac{\chi\phi}{2} t_{N_t}^2)} & e^{j2\pi 2(\phi t_{N_t} + \frac{\chi\phi}{2} t_{N_t}^2)} & \cdots & e^{j2\pi N_h(\phi t_{N_t} + \frac{\chi\phi}{2} t_{N_t}^2)} \end{bmatrix}$$

$$\overline{A} = \begin{pmatrix} A_1 \\ \vdots \\ A_{N_h} \end{pmatrix}.$$

The best value for $\overline{A}$ may be solved via standard linear regression in discrete time, as follows:

$$\overline{A} = M(\phi, \chi) \backslash s, \quad \text{EQN. 3}$$

where the symbol \ represents matrix left division (e.g., linear regression).

Due to input signal 114 being real, the fitted coefficients may be doubled with their complex conjugates as:

$$m(t) = (M(\phi, \chi) \; M^*(\phi, \chi))\begin{pmatrix} \overline{A} \\ \overline{A}^* \end{pmatrix}. \quad \text{EQN. 4}$$

The optimal values of $\phi, \chi$ may not be determinable via linear regression. A nonlinear optimization step may be performed to determine the optimal values of $\phi, \chi$. Such a nonlinear optimization may include using the residual sum of squares as the optimization metric:

$$[\hat{\phi}, \hat{\chi}] = \underset{\phi, \chi}{\mathrm{argmin}}\left[\sum_t (s(t) - m(t, \phi, \chi, \overline{A}))^2 \Big|_{\overline{A} = M(\phi,\chi)\backslash s}\right], \quad \text{EQN. 5}$$

where the minimization is performed on $\phi, \chi$ at the value of $\overline{A}$ given by the linear regression for each value of the parameters being optimized.

The transform module 108A may be configured to impose continuity to different fits over time. That is, both continuity in the pitch estimation and continuity in the coefficients estimation may be imposed to extend the model set forth in EQN. 1. If the pitch becomes a continuous function of time (i.e., $\phi = \phi(t)$), then the chirp may be not needed because the fractional chirp may be determined by the derivative of $\phi(t)$ as $$\chi(t) = \frac{1}{\phi(t)} \frac{d\phi(t)}{dt}.$$

According to some implementations, the model set forth by EQN. 1 may be extended to accommodate a more general time dependent pitch as follows:

$$m(t) = \Re\left(\sum_{h=1}^{N_h} A_h(t) e^{j2\pi h \int_0^t \phi(\tau) d\tau}\right) = \Re\left(\sum_{h=1}^{N_h} A_h(t) e^{jh\Phi(t)}\right), \quad \text{EQN. 6}$$

where $\Phi(t) = 2\pi \int_o^t \phi(\tau) d\tau$ is integral phase.

According to model set forth in EQN. 6, the harmonic amplitudes $A_h(t)$ are time dependent. The harmonic amplitudes may be assumed to be piecewise linear in time such that linear regression may be invoked to obtain $A_h(t)$ for a given integral phase $\Phi(t)$:

$$A_h(t) = A_h(0) + \sum_i \Delta A_h^i \sigma\left(\frac{t - t^{i-1}}{t^i - t^{i-1}}\right), \quad \text{EQN. 7}$$

where $$\sigma(t) = \begin{cases} 0 & \text{for } t < 0 \\ t & \text{for } 0 \leq t \leq 1 \\ 1 & \text{for } t > 1 \end{cases}$$

and $\Delta A_h^i$ are time-dependent harmonic coefficients. The time-dependent harmonic coefficients $\Delta A_h^i$ represent the variation on the complex amplitudes at times $t^i$.

EQN. 7 may be substituted into EQN. 6 to obtain a linear function of the time-dependent harmonic coefficients $\Delta A_h^i$. The time-dependent harmonic $$\Delta A_h^i$$

may be solved using standard linear regression for a given integral phase $\Phi(t)$. Actual amplitudes may be reconstructed by $$A_h^i = A_h^0 + \sum_1^i \Delta A_h^i.$$

The linear regression may be determined efficiently due to the fact that the correlation matrix of the model associated with EQN. 6 and EQN. 7 has a block Toeplitz structure, in accordance with some implementations.

A given integral phase $\Phi(t)$ may be optimized via nonlinear regression. Such a nonlinear regression may be performed using a metric similar to EQN. 5. In order to reduce the degrees of freedom, $\Phi(t)$ may be approximated with a number of time points across which to interpolate by $\Phi(t) = \text{interp}(\Phi^1 = \Phi(t^1), \Phi^2 = \Phi(t^2), \ldots, \Phi^{N_t} = \Phi(t^{N_t}))$. In some implementations, the interpolation function may be cubic. The nonlinear optimization of the integral pitch may be:

EQN. 8

$$[\Phi^1, \Phi^{N_t}, \ldots \Phi^{N_t}] =$$
$$\operatorname*{argmin}_{\Phi^1, \Phi^2, \ldots, \Phi^{N_t}} \left[ \sum_t \left(s(t) - m\left(t, \Phi(t), \overline{A_h^i}\right)\right)^2 \bigg|_{\Phi(t)=\text{interp}(\Phi^1,\Phi^2,\ldots,\Phi^{N_t})}^{\overline{A_h^i}=M(\Phi(t))s(t)} \right].$$

The different $\Phi^i$ may be optimized one at a time with multiple iterations across them. Because each $\Phi^i$ affects the integral phase only around $t^i$, the optimization may be performed locally, according to some implementations.

Referring now to statistics extraction module 108B, it may be configured to extract statistics from the sound model and/or the linear fit of the sound model of input signal 114 provided by transform module 108A. The statistics may include one or more of a fit statistic, an energy statistic, an evidence statistic, a frequency center-of-mass statistic, a pitch probability statistic, an envelope probability statistic, a chirp confidence statistic, and/or other statistics associated with the sound model and/or the linear fit of the sound model of input signal 114 provided by transform module 108A.

The fit statistic may describe a goodness-of-fit of the linear fit of the sound model. In some implementations, the fit statistic may include $R^2$, the coefficient of determination. Generally speaking, $R^2$ may be a number between 0 and 1.0, and may be used to describe how well a regression line fits a set of data. An $R^2$ value near 1.0 may indicate that a regression line fits the data well, while an $R^2$ value closer to 0 may indicate a regression line does not fit the data very well. Thus, in the context of the linear fit of the sound model, a large $R^2$ value may indicate well-defined harmonics.

The energy statistic may describe energy associated with individual harmonics. In some implementations, a minimum number of harmonics $h_{Min}$ that are always available in input signal 114 may be identified. By way of non-limiting example, assuming that harmonics up to 5 kHz are of interest, if the highest pitch obtained is 200 Hz, the minimum number of harmonics will be twenty five. A complex amplitude for individual harmonics may be determined. The energy of a given harmonic may be the modulus squared. The energy for a given time sample may be the sum of energies over the $h_{Min}$ harmonics.

The evidence statistic may indicate whether a given harmonic exceeds a background signal. According to some implementations, energy and $R^2$ may be useful when considered together. For example, if both energy and $R^2$ are large together, harmonics may likely be present. However, energy may be large if the noise is large, and, to a lesser extent, the same may be true of $R^2$. Furthermore, energy and $R^2$ may be dominated by a few strong harmonics (e.g., lower harmonics). In some implementations, the energy associated with individual harmonics may be ranked. For a given harmonic, individual data points associated with that harmonic may be tagged as being within or outside a range of amplitudes (e.g., top quartile). A tag indicating being within the range may be associated with a value of one, whereas a tag indicating being outside the range may be associated with a value of zero. The sum of the values associated with the tags for the given harmonic may be the evidence statistic for that harmonic, according to some implementations.

The frequency center-of-mass statistic may approximately describe a middle position of a frequency distribution of harmonics. A "chop" may be observed in some harmonic regions in a spectrogram where the lower harmonics persist, but the upper harmonics fall off abruptly. Regardless of the cause of the upper harmonics disappearing, it may be desirable to maintain a conclusion that speech exists in that region. During such chops, the total energy may be observed to fall. This may also be true for $R^2$ and/or the evidence statistic. For individual time samples, the center of mass may be determined as:

$$\mu = \frac{\sum_{j=1}^{k} |a_i| w_i}{\sum_{w=1}^{b} |a_i|},$$ EQN. 9 where $|a_i|$ is the magnitude of the $i^{th}$ harmonic, $\omega_i$ is its peak frequency, and k is $h_{Min}$. The second central moment may be determined as:

$$a^2 = \frac{\sum_{i=1}^{k} |a_i|(\omega_i - \mu)^2}{\sum_{w=1}^{b} |a_i|},$$ EQN. 10

The region:

$$[\mu - 2\sqrt{\sigma^2}, \mu + 2\sqrt{\sigma^3}],$$ EQN. 11 may be approximately the 95% confidence interval around the middle position of a frequency distribution of harmonics. When the upper harmonics are chopped off, the center of mass may fall in frequency, but the total energy may remain substantial, and the confidence interval may be fairly localized. When the upper harmonics disappear altogether, the location of the center of mass may be unpredictable, the energy may fall to near zero, and the confidence margin may become large. When a diffuse high-frequency signal appears, the confidence margin may be localized, but the center of mass may be at a high frequency.

The pitch probability statistic may describe a probability distribution of pitch associated with a human speaker associated with the speech component of the input signal. Background sound in the noise component of input signal 114 may occasionally harmonics. The background harmonics may have a unique pitch and/or may contaminate the pitch of the speech component of input signal 114. The pitch of a voice for a given individual varies over a narrow range (e.g., two-fold) and typically dwells near the middle of this range. The statistics extraction module 108B may be configured to train on speech for a particular person to observe the probability distribution for his pitch over the course of speech. The probability of any pitch observed in input signal 114 belonging to that particular person may then be determined. For example, an adult male may have a pitch within 100 to 200 Hz 95% of the time. In that case, the observation of pitch at 300 Hz may trigger a low probability suggesting the harmonics being detected do not belong to the voice being tracked. Even without prior training, the pitch probability statistic may be determined. All humans speak with pitches within a reasonably narrow range—about 80 Hz to 500 Hz. Therefore, machines, animals, and/or other sources—even noise—may likely have pitches with low probability given the assumption of a human speaker.

The envelope probability statistic may describe a typical range of envelope shapes associated with a human speaker. Some machines emit sounds with pitches that overlap pitches of human voices. For example, automobile engines may have pitches similar to those of adult males. The envelopes of machine and other non-vocal sounds are generally quite different from envelopes of human voices. For example, musical instruments have harmonics that fall off less abruptly than voice, while machines often have envelopes dominated by a single overtone. The statistics extraction module 108B may be configured to train on a particular speaker's voice and/or on the general population of speakers' voices to establish a typical range of envelope shapes. A probability distribution for an envelope of a particular speaker's voice and/or on the general population of speakers' voices may be determined and compared to envelopes in input signal 114.

The chirp confidence statistic may describe a confidence of a chirp estimate. Under noisy conditions, in the absence of voice, a value for $R^2$ and/or a pitch value may be identified that are not inconsistent with voice. Voice present in input signal 114 may have a distinct chirp rate. This chirp rate may be zero, but it may still be distinct. The pitch of a voice will not rise, fall, and stay constant all at once. This may translate to a peak in a graph of $R^2$ over the pitch-chirp grid. Even with a pure noise stimulus, R2 may have a peak so maximum-likelihood (ML) pitch and chirp values may be identified. A Gaussian function may be fitted along the chirp dimension with the ML pitch coordinate fixed. The variance of this fit may be a basis for the confidence of the chirp estimate. According to some implementations, a large confidence may imply a sound with a distinct chirp rate.

The time-striping module 108C may be configured to identify vocalized speech portions of input signal 114, the sound model of input signal 114, and/or the linear fit of the sound model of input signal 114. Generally speaking, vocalized speech may describe to portions of speech during which the vocal chords vibrate. Often this corresponds to vowel sounds, but can also correspond to some consonant sounds (e.g., the "m" sound in the word "middle"). The vocalized speech portions may be identified by detecting a presence of harmonics as a function of time based on individual ones of the statistics extracted by statistics extraction module 108B. The time-striping module 108C may be configured to determine probabilities that the portions of the speech component represented by the input signal is the individual time windows are vocalized portions or non-vocalized portions based on the statistics determined for the sound models individual time windows. The time-striping module 108C may be configured to classify the portions of the speech component represented by the input signal in the individual time windows as vocalized portions or non-vocalized portions based on the statistics determined for the individual time windows.

In some implementations, time-striping module 108C may be configured to combine multiple ones of the statistics provided by statistics extraction module 108B into an authoritative statistic such that a presence of a harmonic is detected responsive to the authoritative statistic breaching a threshold. An example of such an authoritative statistic indicative of a voiced speech time stripe may be given as:

$$T_V = \left(Z\left(\frac{HE-TE}{HE+TE}\right) > 0\right) \cap ((Z(CP) > 0) \cup (Z(CC) > 0)), \quad \text{EQN. 12}$$

where $Z(\ )$ is a z-score function, HE is the energy contained in the harmonics, TE is the total energy in the audio sample, CP is the confidence of the pitch fit (e.g., $R^2$ value of the pitch fit), and CC is the confidence of the chirp fit (e.g., $R^2$ value of the chirp fit). An example of an authoritative statistic indicative of a non-voiced speech time stripe may be given as:

$$T_{NV} = \left(\frac{1+Z(TE)}{1+Z(HE)}Z(HFE) + Z(CM) - Z(VCM) > 0\right), \quad \text{EQN. 13}$$

where HFE is the high frequency energy (e.g., energy for frequencies above about 3 kHz), CM is the frequency center of mass (e.g., first moment of the signal frequency as weighted by harmonic amplitude), and VCM is the frequency center of mass variance (e.g., second moment of the signal frequency as weighted by harmonic amplitude).

Figure 3:
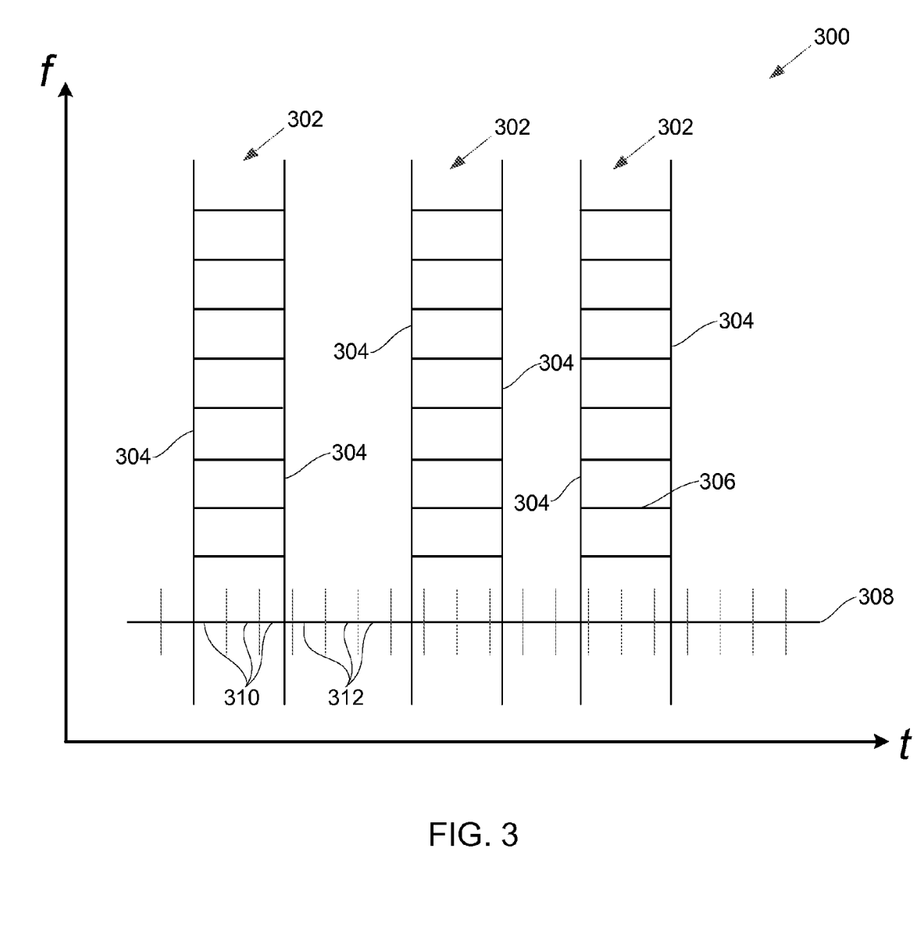
FIG. 3 illustrates an exemplary spectrogram with speech portions identified by vertical stripes, in accordance with one or more implementations.

The vocalized speech portions may be visualizable as approximately vertical stripes in a spectrograph of the sound model, where the horizontal axis of the spectrograph corresponds to time and the vertical axis of the spectrograph corresponds to frequency. FIG. 3 illustrates an exemplary spectrogram 300 with vocalized speech portions 302 identified by vertical stripes 304, in accordance with one or more implementations. In spectrogram 300, the horizontal axis represents time (t) and the vertical axis represents frequency (f). A third dimension indicating the amplitude of a particular frequency at a particular time emerges out of the page. A trace of an amplitude peak as a function of time may delineate a harmonic in a signal visualized by a spectrogram (e.g., harmonic 306 in spectrogram 300). A segmented input signal 308, which may be similar to input signal 114, is overlaid on spectrogram 300. The vertical stripes 304 also demarcate time windows 310 conveying vocalized portions and time windows 312 conveying non-vocalized portions.

Turning again to FIG. 1, vocalized speech module 108D may be configured to process sound models of time windows in which the speech component represented by the input signal is classified as vocalized portions. That is, a given sound model may be processed by vocalized speech module 108D responsive to the speech component represented by the input signal during the corresponding time window being classified as a vocalized portion. Processing the given sound model by vocalized speech module 108D may include processing the given sound model in conjunction with one or more other modules described herein other than non-vocalized speech module 108E. In some implementations, processing sound models of time windows conveying vocalized portions of the speech component may include synthesizing vocalized speech and/or other processes.

The non-vocalized speech module 108E may be configured to process sound models of time windows in which the speech component represented by the input signal is classified as non-vocalized portions. That is, a given sound model may be processed by the non-vocalized speech module 108E responsive to the speech component represented by the input signal during the corresponding time window being classified as a non-vocalized portion. Processing the given sound model by non-vocalized speech module 108E may include processing the given sound model in conjunction with one or more other modules described herein other than vocalized speech module 108D. In some implementations, processing sound models of time windows conveying non-vocalized portions of the speech component may include synthesizing non-vocalized speech and/or other processes.

The formant model module 108F may be configured to model harmonic amplitudes based on a formant model. Generally speaking, a formant may be described as the spectral resonance peaks of the sound spectrum of the voice. One formant model—the source-filter model—postulates that vocalization in humans occurs via an initial periodic signal produced by the glottis (i.e., the source), which is then modulated by resonances in the vocal and nasal cavities (i.e., the filter). In some implementations, the harmonic amplitudes may be modeled according to the source-filter model as:

$$A_h(t) = A(t)G(g(t), \omega(t))\left[\prod_{r=1}^{N_f} F(f_r(t), \omega(t))\right] R(\omega(t))\Big|_{\omega(t) = \phi(t)h}, \quad \text{EQN. 14}$$

where $A(t)$ is a global amplitude scale common to all the harmonics, but time dependent. G characterizes the source as a function of glottal parameters $g(t)$. Glottal parameters $g(t)$ may be a vector of time dependent parameters. In some implementations, G may be the Fourier transform of the glottal pulse. F describes a resonance (e.g., a formant). The various cavities in a vocal tract may generate a number of resonances F that act in series. Individual formants may be characterized by a complex parameter $f_r(t)$. R represents a parameter-independent filter that accounts for the air impedance.

In some implementations, the individual formant resonances may be approximated as single pole transfer functions:

$$F(f(t), \omega(t)) = \frac{f(t)f(t)^*}{(j\omega(t) - f(t))(j\omega(t) - f(t)^*)}, \quad \text{EQN. 15}$$

where $f(t) = jp(t) + d(t)$ is a complex function, $p(t)$ is the resonance peak $p(t)$, and $d(t)$ is a dumping coefficient. The fitting of one or more of these functions may be discretized in time in a number of parameters $p^i, d^i$ corresponding to fitting times $t^i$.

According to some implementations, R may be assumed to be $R(t) = 1 - j\omega(t)$, which corresponds to a high pass filter.

The Fourier transform of the glottal pulse G may remain fairly constant over time. In some implementations, $G = g(t) g E(g(t))_r$. The frequency profile of G may be approximated in a nonparametric fashion by interpolating across the harmonics frequencies at different times.

Given the model for the harmonic amplitudes set forth in EQN. 9, the model parameters may be regressed using the sum of squares rule as:

$$[A(t), \hat{g}(t), f_r(t)] = \underset{A(t),g(t),f_r(t)}{\operatorname{argmin}} \left( A_h(t) - A(t)G(g(t), \omega(t)) \left[ \prod_{r=1}^{N_f} F(f_r(t), \omega(t)) \right] R(\omega(t)) \bigg|_{\omega(t)=\phi(t)h} \right)^2. \quad \text{EQN. 16}$$

The regression in EQN. 11 may be performed in a nonlinear fashion assuming that the various time dependent functions can be interpolated from a number of discrete points in time. Because the regression in EQN. 11 depends on the estimated pitch, and in turn the estimated pitch depends on the harmonic amplitudes (see, e.g., EQN. 8), it may be possible to iterate between EQN. 11 and EQN. 8 to refine the fit.

In some implementations, the fit of the model parameters may be performed on harmonic amplitudes only, disregarding the phases during the fit. This may make the parameter fitting less sensitive to the phase variation of the real signal and/or the model, and may stabilize the fit. According to one implementation, for example:

$$[A(t), \hat{g}(t), f_r(t)] = \underset{A(t),g(t),f_r(t)}{\operatorname{argmin}} \left( \|A_h(t)\| - \left\| A(t)G(g(t), \omega(t)) \left[ \prod_{r=1}^{N_f} F(f_r(t), \omega(t)) \right] R(\omega(t)) \right\|_{\omega(t)=\phi(t)h} \right)^2. \quad \text{EQN. 17}$$

In accordance with some implementations, the formant estimation may occur according to:

$$[A(t), f_r(t)] = \underset{A(t),f_r(t)}{\operatorname{argmin}} \left( \sum_h \operatorname{Var}_t \left( \frac{A_h(t)}{A(t) \left[ \prod_{r=1}^{N_f} F(f_r(t), \omega(t)) \right] \bigg|_{\omega(t)=\frac{d\Phi}{dt}(t)h}} \right) \right)^2. \quad \text{EQN. 18}$$

EQN. 15 may be extended to include the pitch in one single minimization as:

$$[\Phi(t), A(t), f_r(t)] = \underset{\Phi(t),A(t),f_r(t)}{\operatorname{argmin}} \left( \sum_h \operatorname{Var}_t \left( \frac{s(t) \backslash M(\Phi(t))}{A(t) \left\| \prod_{r=1}^{N_f} F(f_r(t), \omega(t)) \right\|_{\omega(t)=\frac{d\Phi}{dt}(t)h}} \right) \right)^2. \quad \text{EQN. 19}$$

The minimization may occur on a discretized version of the time-dependent parameter, assuming interpolation among the different time samples of each of them.

The final residual of the fit on the HAM($A_h(t)$) for both EQN. 15 and EQN. 16 may be assumed to be the glottal pulse. The glottal pulse may be subject to smoothing (or assumed constant) by taking an average:

$$G(\omega) = E_t(G(\omega, t)) = E_t \left( \frac{A_h(t)}{A(t) \left[ \prod_{r=1}^{N_f} F(f_r(t), \omega) \right] \bigg|_{\omega=\frac{d\Phi}{dt}(t)h}} \right). \quad \text{EQN. 20}$$

The reconstruction module 110 may be configured to reconstruct the speech component of input signal 114 with the noise component of input signal 114 being suppressed. The reconstruction may be performed once each of the parameters of the formant model has been determined. The reconstruction may be performed by interpolating all the time-dependent parameters and then resynthesizing the waveform of the speech component of input signal 114 according to:

$$s(t) = 2\Re \left( \sum_{h=1}^{N_h} A(t)G(\omega) \left[ \prod_{r=1}^{N_f} F(f_r(t), \omega(t)) \right] R(\omega(t)) \bigg|_{\omega(t)=\frac{d\Phi(t)}{dt}h} e^{j\Phi(t)} \right). \quad \text{EQN. 21}$$

The output module 112 may be configured to transmit an output signal 118 to a destination 120. The output signal 118 may include the reconstructed speech component of input signal 114, as determined by EQN. 18. The destination 120 may include a speaker (i.e., an electric-to-acoustic transducer), a remote device, and/or other destination for output signal 118. By way of non-limiting illustration, where communications platform 102 is a mobile communications device, a speaker integrated in the mobile communications device may provide output signal 118 by converting output signal 118 to sound to be heard by a user. As another illustration, output signal 118 may be provided from communications platform 102 to a remote device. The remote device may have its own speaker that converts output signal 118 to sound to be heard by a user of the remote device.

In some implementations, one or more components of system 100 may be operatively linked via one or more electronic communication links. For example, such electronic communication links may be established, at least in part, via a network such as the Internet, a telecommunications network, and/or other networks. It will be appreciated that this is not intended to be limiting, and that the scope of this disclosure includes implementations in which one or more components of system 100 may be operatively linked via some other communication media.

The communications platform 102 may include electronic storage 122, one or more processors 124, and/or other components. The communications platform 102 may include communication lines, or ports to enable the exchange of information with a network and/or other platforms. Illustration of communications platform 102 in FIG. 1 is not intended to be limiting. The communications platform 102 may include a plurality of hardware, software, and/or firmware components operating together to provide the functionality attributed herein to communications platform 102. For example, communications platform 102 may be implemented by two or more communications platforms operating together as communications platform 102. By way of non-limiting example, communications platform 102 may include one or more of a server, desktop computer, a laptop computer, a handheld computer, a NetBook, a Smartphone, a cellular phone, a telephony headset, a gaming console, and/or other communications platforms.

The electronic storage 122 may comprise electronic storage media that electronically stores information. The electronic storage media of electronic storage 122 may include one or both of system storage that is provided integrally (i.e., substantially non-removable) with communications platform 102 and/or removable storage that is removably connectable to communications platform 102 via, for example, a port (e.g., a USB port, a firewire port, etc.) or a drive (e.g., a disk drive, etc.). The electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). The electronic storage 122 may store software algorithms, information determined by processor(s) 124, information received from a remote device, information received from source 116, information to be transmitted to destination 120, and/or other information that enables communications platform 102 to function as described herein.

The processor(s) 124 may be configured to provide information processing capabilities in communications platform 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 104, 108A, 108B, 108C, 108D, 108E, 108F, 110, 112, and/or other modules. The processor(s) 124 may be configured to execute modules 104, 108A, 108B, 108C, 108D, 108E, 108F, 110, 112, and/or other modules by software; hardware; firmware; some combination of software, hardware, and/or firmware; and/or other mechanisms for configuring processing capabilities on processor(s) 124.

It should be appreciated that although modules 104, 108A, 108B, 108C, 108D, 108E, 108F, 110, and 112 are illustrated in FIG. 1 as being co-located within a single processing unit, in implementations in which processor(s) 124 includes multiple processing units, one or more of modules 104, 108A, 108B, 108C, 108D, 108E, 108F, 110, and/or 112 may be located remotely from the other modules. The description of the functionality provided by the different modules 104, 108A, 108B, 108C, 108D, 108E, 108F, 110, and/or 112 described below is for illustrative purposes, and is not intended to be limiting, as any of modules 104, 108A, 108B, 108C, 108D, 108E, 108F, 110, and/or 112 may provide more or less functionality than is described. For example, one or more of modules 104, 108A, 108B, 108C, 108D, 108E, 108F, 110, and/or 112 may be eliminated, and some or all of its functionality may be provided by other ones of modules 104, 108A, 108B, 108C, 108D, 108E, 108F, 110, and/or 112. As another example, processor(s) 124 may be configured to execute one or more additional modules that may perform some or all of the functionality attributed below to one of modules 104, 108A, 108B, 108C, 108D, 108E, 108F, 110, and/or 112.

Figure 4:
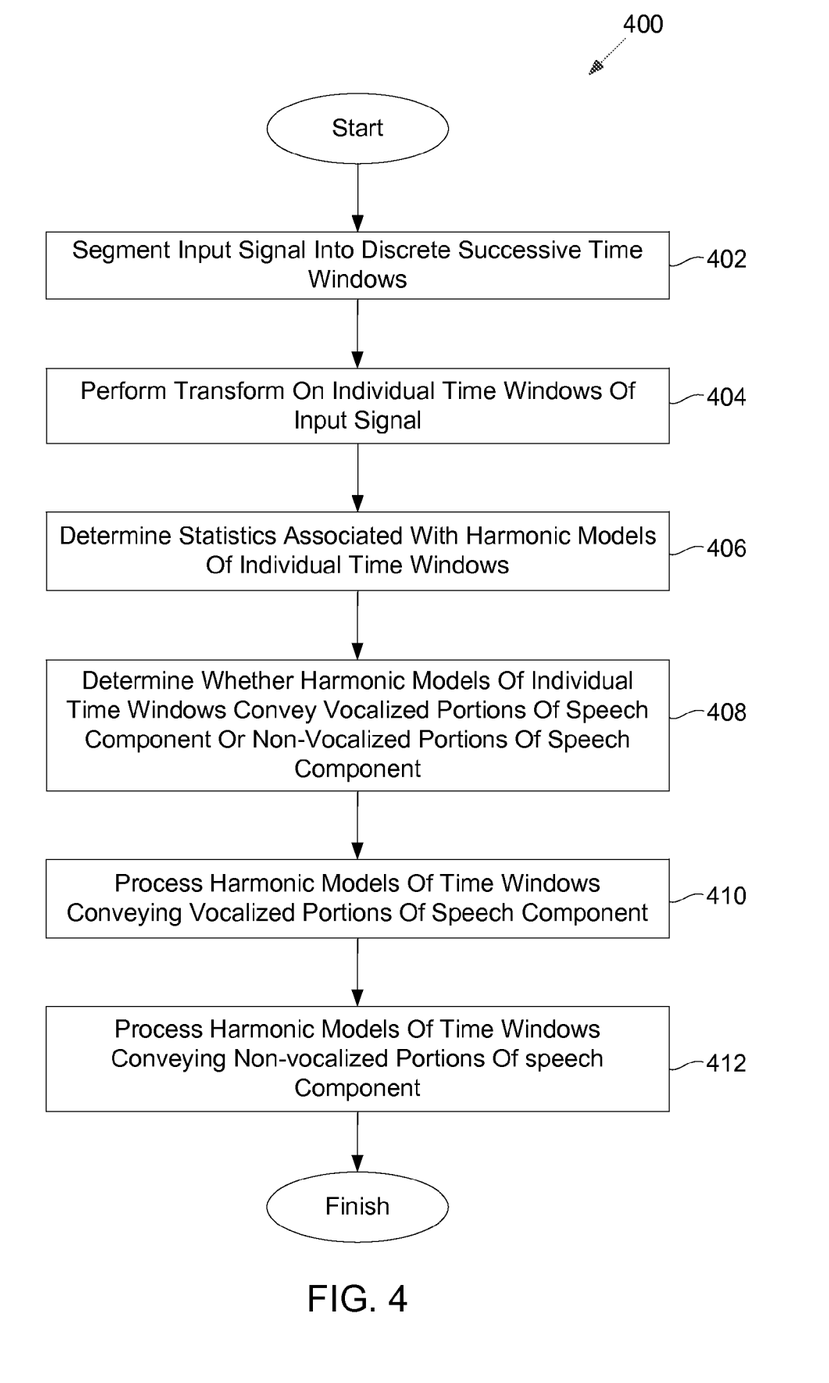
FIG. 4 illustrates a method for performing voice enhancement on noisy audio signals, in accordance with one or more implementations.

FIG. 4 illustrates a method 400 for performing voice enhancement on noisy audio signals, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an input signal may be segmented into discrete successive time windows. The input signal may convey audio comprising a speech component superimposed on a noise component. The time windows may include a first time window. Operation 402 may be performed by one or more processors configured to execute a preprocessing module that is the same as or similar to preprocessing module 106, in accordance with one or more implementations.

At an operation 404, a transform may be performed on individual time windows of the input signal to obtain corresponding sound models of the input signal in the individual time windows. A first sound model may be a mathematical representation of harmonics in the first time window of the input signal. Operation 404 may be performed by one or more processors configured to execute a transform module that is the same as or similar to transform module 108A, in accordance with one or more implementations.

At an operation 406, statistics associated with the sound models of individual time windows of the input signal may be determined. The statistics may include a statistic for the first time window extracted from the first sound model. Operation 406 may be performed by one or more processors configured to execute a statistics extraction module that is the same as or similar to statistics extraction module 108B, in accordance with one or more implementations.

At an operation 408, a determination may be made as to whether the sound models of individual time windows convey vocalized portions of the speech component or non-vocalized portions of the speech component based on the statistics determined for the sound models individual time windows. In some implementations, operation 408 may include determining probabilities that the portions of the speech component represented by the input signal in the individual time windows are vocalized portions or non-vocalized portions based on the statistics determined for the individual time windows. Operation 408 may be performed by one or more processors configured to execute a time striping module that is the same as or similar to time striping module 108C, in accordance with one or more implementations.

At an operation 410, sound models of time windows conveying vocalized portions of the speech component may be processed. The first sound model may be processed by a vocalized speech module responsive to a determination that the first time window conveys a vocalized portion of the speech component based on a corresponding probability.

Operation 410 may be performed by one or more processors configured to execute a vocalized speech module that is the same as or similar to vocalized speech module 108D, in accordance with one or more implementations.

At an operation 412, sound models of time windows conveying non-vocalized portions of the speech component may be processed. The first sound model may be processed by a non-vocalized speech module responsive to a determination that the first time window conveys a non-vocalized portion of the speech component based on the corresponding probability. Operation 412 may be performed by one or more processors configured to execute a non-vocalized speech module that is the same as or similar to non-vocalized speech module 108E, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to perform voice enhancement on noisy audio signals, the system comprising:
   one or more processors configured to execute computer program modules, the computer program modules comprising:
      a preprocessing module configured to segment an input signal into discrete successive time windows, the input signal conveying audio comprising a speech component superimposed on a noise component, the time windows including a first time window;
      a transform module configured to perform a transform on individual time windows of the input signal to obtain corresponding sound models of the input signal in the individual time windows, a first sound model being a mathematical representation of harmonics in the first time window of the input signal;
      a statistics extraction module configured to determine statistics associated with the sound models of individual time windows of the input signal, the statistics including a statistic for the first time window extracted from the first sound model;
      a time-striping module configured to determine probabilities that the portions of the speech component represented by the input signal in the individual time windows are vocalized portions or non-vocalized portions based on the statistics determined for the sound models individual time windows;
      a vocalized speech module configured to process sound models of time windows in which the speech component represented by the input signal is classified as vocalized portions based on the probabilities, the first sound model being processed by the vocalized speech module responsive to the speech component represented by the input signal during the first time window being classified as a vocalized portion based on a corresponding probability; and
      a non-vocalized speech module configured to process sound models of time windows in which the speech component represented by the input signal is classified as non-vocalized portions based on the probabilities, the first sound model being processed by the non-vocalized speech module responsive to the speech component represented by the input signal during the first time window being classified as a non-vocalized portion based on the corresponding probability.

2. The system of claim 1, wherein the speech portions are visualizable as approximately vertical stripes in a spectrograph of a given sound model corresponding to a given time window where the horizontal axis of the spectrograph corresponds to time and the vertical axis of the spectrograph corresponds to frequency.

3. The system of claim 1, the time-striping module is further configured to combine multiple ones of the statistics into an authoritative statistic such that a presence of a harmonic is detected responsive to the authoritative statistic breaching a threshold.

4. The system of claim 1, wherein the statistics include a fit statistic that describes a goodness-of-fit of the linear fit of the sound model.

5. The system of claim 1, wherein the statistics include an energy statistic that describes energy associated with individual harmonics.

6. The system of claim 1, wherein the statistics include an evidence statistic that indicates whether a given harmonic exceeds a background signal.

7. The system of claim 1, wherein the statistics include a frequency center-of-mass statistic that approximately describes a middle position of a frequency distribution of harmonics.

8. The system of claim 1, wherein the statistics include a pitch probability statistic that describes a probability distribution of pitch associated with a human speaker associated with the speech component of the input signal.

9. The system of claim 1, wherein the statistics include an envelope probability statistic that describes a typical range of envelope shapes associated with a human speaker.

10. The system of claim 1, wherein the statistics include a chirp confidence statistic that describes a confidence of a chirp estimate.

11. A processor-implemented method performing voice enhancement on noisy audio signals, the method comprising:
   segmenting, using one or more processors, an input signal into discrete successive time windows, the input signal conveying audio comprising a speech component superimposed on a noise component, the time windows including a first time window;
   performing, using one or more processors, a transform on individual time windows of the input signal to obtain corresponding sound models of the input signal in the individual time windows, a first sound model being a mathematical representation of harmonics in the first time window of the input signal;
   determining, using one or more processors, statistics associated with the sound models of individual time windows of the input signal, the statistics including a statistic for the first time window extracted from the first sound model;
   determining, using one or more processors, probabilities that the portions of the speech component represented by the input signal in the individual time windows are vocalized portions or non-vocalized portions based on the statistics determined for the sound models individual time windows;
   processing, using one or more processors, sound models of time windows in which the speech component represented by the input signal is classified as vocalized portions based on the probabilities, the first sound model being processed responsive to the speech component represented by the input signal during the first time window being classified as a vocalized portion based on a corresponding probability; and processing, using one or more processors, sound models of time windows in which the speech component represented by the input signal is classified as non-vocalized portions, the first sound model being processed responsive to the speech component represented by the input signal during the first time window being classified as a non-vocalized portion based on the corresponding probability.

12. The method of claim 11, wherein the speech portions are visualizable as approximately vertical stripes in a spectrograph of a given sound model corresponding to a given time window where the horizontal axis of the spectrograph corresponds to time and the vertical axis of the spectrograph corresponds to frequency.

13. The method of claim 11, further comprising combining, with one or more processors, multiple ones of the statistics into an authoritative statistic such that a presence of a harmonic is detected responsive to the authoritative statistic breaching a threshold.

14. The method of claim 11, wherein the statistics include a fit statistic that describes a goodness-of-fit of the linear fit of the sound model.

15. The method of claim 11, wherein the statistics include an energy statistic that describes energy associated with individual harmonics.

16. The method of claim 11, wherein the statistics include an evidence statistic that indicates whether a given harmonic exceeds a background signal.

17. The method of claim 11, wherein the statistics include a frequency center-of-mass statistic that approximately describes a middle position of a frequency distribution of harmonics.

18. The method of claim 11, wherein the statistics include a pitch probability statistic that describes a probability distribution of pitch associated with a human speaker associated with the speech component of the input signal.

19. The method of claim 11, wherein the statistics include an envelope probability statistic that describes a typical range of envelope shapes associated with a human speaker.

20. The method of claim 11, wherein the statistics include a chirp confidence statistic that describes a confidence of a chirp estimate.

* * * * *